(12) United States Patent
Akieda et al.

(10) Patent No.: US 7,737,943 B2
(45) Date of Patent: Jun. 15, 2010

(54) INPUT DEVICE

(75) Inventors: Shinichiro Akieda, Shinagawa (JP); Junichi Akama, Shinagawa (JP); Noboru Fujii, Shinagawa (JP); Takashi Arita, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 991 days.

(21) Appl. No.: 11/280,195

(22) Filed: Nov. 17, 2005

(65) Prior Publication Data

US 2006/0103628 A1   May 18, 2006

(30) Foreign Application Priority Data

Nov. 18, 2004   (JP)   ............................. 2004-335191

(51) Int. Cl.
*G09G 5/00* (2006.01)
(52) U.S. Cl. ...................................... 345/156; 345/157
(58) Field of Classification Search .......... 345/156–163
See application file for complete search history.

(56) References Cited

U.S. PATENT DOCUMENTS

| | | | | |
|---|---|---|---|---|
| 5,504,502 | A * | 4/1996 | Arita et al. | 345/160 |
| 6,100,874 | A * | 8/2000 | Schena et al. | 345/157 |
| 6,504,528 | B1 * | 1/2003 | Kermani et al. | 345/163 |
| 2002/0093328 | A1 * | 7/2002 | Maatta et al. | 324/207.11 |
| 2002/0190945 | A1 * | 12/2002 | Arita et al. | 345/156 |

FOREIGN PATENT DOCUMENTS

| | | |
|---|---|---|
| JP | 7-146102 | 6/1995 |
| JP | 10-207616 | 8/1998 |

* cited by examiner

*Primary Examiner*—Amare Mengistu
*Assistant Examiner*—Premal Patel
(74) *Attorney, Agent, or Firm*—Staas & Halsey LLP

(57) ABSTRACT

An input device includes a substrate and a movable object that moves on the substrate. One of the substrate and the movable object includes a magnetic field generator and the other of the substrate and the movable object includes electromagnetic conversion elements provided to detect magnetic fields generated outside of the magnetic field generator.

13 Claims, 16 Drawing Sheets

INPUT DEVICE

BACKGROUND OF THE INVENTION

1. Field of the Invention

This invention generally relates to an input device for use in inputting an instruction to a personal computer, and in particular, relates to an input device using a position detection signal of a movable object moving on a substrate.

2. Description of the Related Art

Conventionally, an input device, which inputs an instruction using position information of a movable object, is known. This input device is, for example, connected to a computer and is used as an input device to input an instruction of a user. Japanese Patent Application Publication No. 7-146102 (hereinafter referred to as Document 1) discloses an input device, in which a hall element is arranged at one end of a lower yoke and a movable object formed of a magnet and an upper yoke slides on the lower yoke. When the upper yoke is located on the hall element, the input device forms a closed magnetic circuit and detects the position of the movable object. In addition, an input device disclosed in Japanese Patent Application Publication No. 10-207616 (hereinafter referred to as Document 2) includes a reflecting plate provided on a movable object so that a user can place his or her finger to slide the movable object, a luminous element arranged below the reflecting plate, and a plurality of light receiving elements which receive lights emitted from the luminous elements and reflected on the reflecting plate. The input device detects the position of the movable object based on the detection signal of the receiving element.

There is a demand for reducing the size and the thickness of the input device mentioned above as in the case of the other electronics devices. However, the input device disclosed in Document 1 detects the position of the movable object by forming a closed magnetic circuit when the movable object approaches the hall element. For that purpose, the movable object has a build-up structure in which the upper yoke is secured on the magnet. The thickness of the input device increases if the movable object having the afore-mentioned structure is arranged in the input device. This does not satisfy the demand for reducing the thickness.

Further, when the upper yoke is used, the input device has an increased number of components and the input device grows in size. This does not satisfy the demand for reducing the size. In addition, the input device disclosed in Document 2 has a structure in which the luminous element is arranged below the reflect plate provided on the movable object and a light from the luminous element is reflected by the reflect plate. Therefore, it is necessary to provide a light path (space) between the reflect plate and the luminous element for reflection. This results in the increased thickness of the input device, and does not satisfy the demand for reducing the thickness.

SUMMARY OF THE INVENTION

The present invention has an object to reduce the thickness and the size of an input device.

According to an aspect of the present invention, preferably, there is provided an input device including a substrate and a movable object that moves on the substrate. One of the substrate and the movable object includes a magnetic field generator, and the other of the substrate and the movable object includes electromagnetic conversion elements arranged to detect magnetic fields generated outside of the magnetic field generator.

According to another aspect of the present invention, preferably, there is provided an input device including a substrate and a movable object that moves on the substrate. One of the substrate and the movable object includes a luminous object that emits lights, and the other of the substrate and the movable object includes photoelectric conversion elements arranged to detect lights vertical to the substrate.

In accordance with the present invention, electromagnetic conversion elements detect magnetic fields generated outside of the magnetic field generator, and it is possible to arrange the magnetic field generator and the electromagnetic conversion elements at a same level. Therefore, it is possible to reduce the thickness of an input device in accordance with the present invention. In addition, the magnetic fields generated outside of the magnetic field generator are generally provided most linear outside of a boundary between magnetic poles adjacently arranged. In this input device, the electromagnetic conversion elements are arranged to detect a linear magnetic field, and this input device needs no assisting yokes to form a magnetic path or the like. Therefore, it is possible to simplify the structure of this input device and reduce the size thereof.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of embodiments of the present invention.

First Embodiment

Figure 1A:
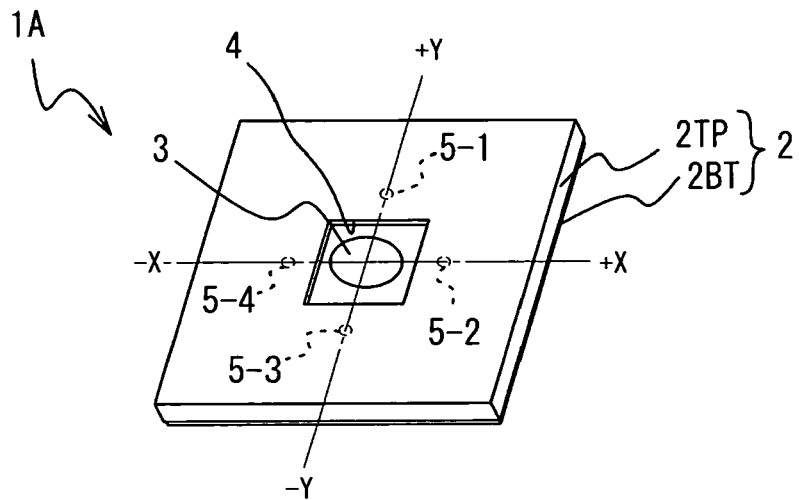
FIGS. 1A through 1C illustrate an input device in accordance with a first embodiment.
Figure 1B:
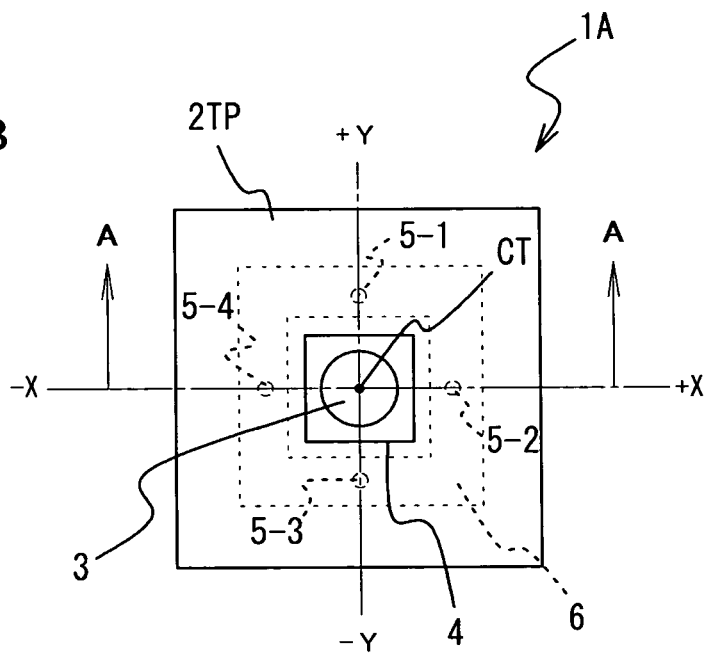
Figure 1C:
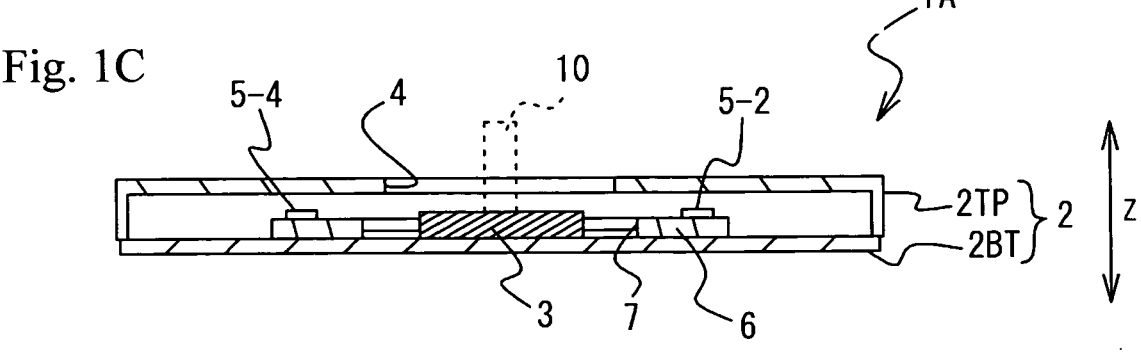

FIGS. 1A through 1C illustrate an input device 1A in accordance with a first embodiment of the present invention. FIG. 1A illustrates a perspective view of an exterior of the input device 1A. FIG. 1B illustrates a top view of the input device 1A. FIG. 1C illustrates a cross sectional view taken along a line A-A shown in FIG. 1B. The input device 1A has a hollow chassis 2, a magnet 3, and four hall elements 5-1 through 5-4. The magnet 3 serves as a magnetic field generator. The four hall elements 5-1 through 5-4 serve as electromagnetic conversion elements. The magnet 3 and the hall elements 5-1 through 5-4 are arranged in the chassis 2. The chassis 2 is formed of a bottom plate 2BT having a plate shape and a cover member 2TP covering an upper side of the bottom plate 2BT. A rectangular cutout 4 is formed at a central part of the cover member 2TP.

The magnet 3 is arranged to be capable of moving on the bottom plate 2BT. The magnet 3 is, for example, initially located at a center CT of the cutout 4. The four hall elements 5-1 through 5-4 are retained by a support plate 6 secured on the bottom plate 2BT. A cutout 7 is formed on the support plate 6 to correspond to the cutout 4 formed on the cover member 2TP. The magnet 3 slides on the bottom plate 2BT within the cutout 7. As is shown in FIG. 1C, an operating unit 10 is, for example, attached to the magnet 3. The magnet 3 moves to a desirable position when an operator operates the operating unit 10. A moving range of the magnet 3 is a range inside of positions where the operating unit 10 contacts the cover member 2TP (side faces of the cutout 4) or a range inside of positions where the magnet 3 contacts the support plate 6 (side faces of the cutout 7). If the cutout 7 is formed larger than the cutout 4, it is possible to extend the moving range of the magnet 3 to serve as a movable object.

As is shown in FIG. 1B, the four hall elements 5-1 through 5-4 are secured on the support plate 6 at even intervals, surrounding the periphery of the magnet 3 initially arranged. Specifically, the hall elements 5-1 through 5-4 are arranged on an X-axis and a Y-axis which are crossed at right angles at an intersection of the center CT, and two of the hall elements are arranged on the X-axis and the others of the hall elements are arranged on the Y-axis. Further, each of the hall elements 5-1 through 5-4 is arranged equidistant from the center CT. The hall elements 5-1 through 5-4 are configured to detect a magnetic field parallel to a Z-axis, which is crossed at right angles to the X-axis and the Y-axis. And, as is shown in FIG. 1C, the hall elements 5-1 through 5-4 are arranged at approximately the same level as the magnet 3 in a direction of the Z-axis. It is therefore possible to reduce the thickness of the input device 1A, because the hall elements 5-1 through 5-4 are arranged at approximately the same level as the magnet 3. A description will be given, with reference to FIGS. 2A and 2B, of a configuration which allows the hall elements 5-1 through 5-4 to be arranged at the same level in height as the magnet 3.

Figure 2A:
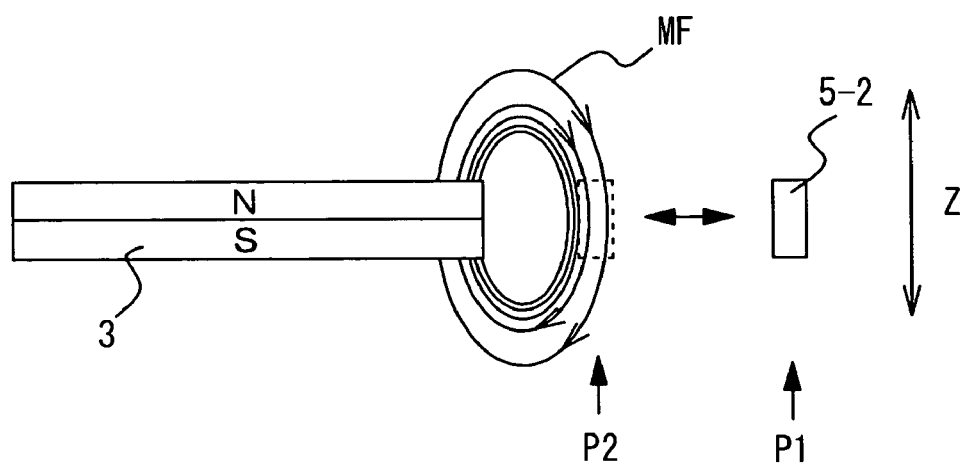
FIGS. 2A and 2B illustrate views showing a frame format of the relationship between a magnet and hall elements in the input device in accordance with the first embodiment.
Figure 2B:
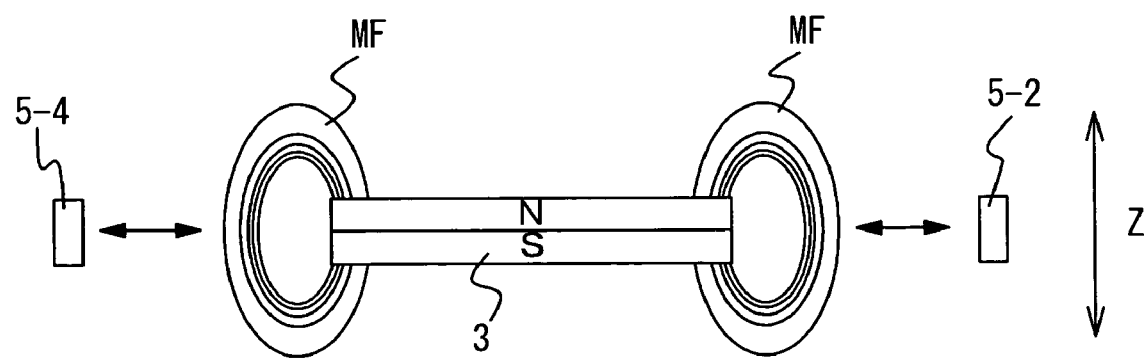

FIGS. 2A and 2B schematically illustrate a view showing a relationship between the magnet 3 and the hall elements. FIG. 2A illustrates an example of the relationship between the magnet 3 and the hall element 5-2. FIG. 2B illustrates an example of the relationship between the magnet 3 and the hall elements 5-2 and 5-3 arranged on the X-axis. A description will be first given of the relationship between the hall element 5-2 and the magnet 3, with reference to FIG. 2A. The magnet 3 is magnetized in such a manner that a north pole is provided on the upper side and a south pole is provided on the down side in the magnet 3. Therefore, a magnetic field MF is generated outside the magnet 3, as is shown in FIG. 2B. The magnetic field MF is substantially parallel to the Z-axis at a center level of the magnet 3 (in the vicinity of the boundary between the north pole and the south pole). On the other hand, the hall element 5-2 detects a magnetic field in the Z-axis direction, and outputs a signal (voltage) according to the magnetic field intensity (magnetic flux density). Therefore, it is possible to detect the magnetic field MF of the magnet 3 effectively using the hall element 5-2, by arranging the hall element 5-2 and the magnet 3 at the substantially same level in height in the Z-axis direction. And, this promotes, as mentioned above, the reduction in the thickness of the input device to arrange the hall element 5-2 and the magnet 3 at the same level in height.

As is shown in FIG. 2A, the hall element 5-2 outputs a small signal in the case of being positioned at a position P1. The hall element 5-2 outputs a big signal in the case of being positioned at a position P2. Thus, it is possible to confirm a change in a relative distance between the magnet 3 and the hall element 5-2. In addition, FIG. 2A shows a case, for the purpose of facilitating the understanding, where the hall element 5-2 moves. However, a distance between the magnet 3 and the hall element 5-2 changes when the magnet 3 moves in the input device 1A shown in FIGS. 1A through 1C.

FIG. 2B illustrates a relationship between the hall elements 5-2 and 5-4 arranged on the X-axis and the magnet 3. The hall elements 5-2 and 5-4 are secured on the support plate 6, and the magnet 3 moves between the hall elements 5-2 and 5-4. Therefore, when the magnet 3 approaches from the initial position (central position in FIG. 2B) to one of the hall elements 5-2 and 5-4, an output from the hall element which the magnet 3 approaches (for example, the hall element 5-2) is increased, whereas an output from the hall element from which the magnet 3 recedes (for example, the hall element 5-4) is decreased. It is thus possible to detect accurately the position of the magnet 3 by confirming a difference in the outputs from the hall elements provided on the same axis. FIG. 2B illustrates a case where the position of the magnet 3 is detected on the X-axis in FIG. 1B. In a similar way, it is possible to detect the position of the magnet 3 with the two hall elements 5-1 and 5-3 arranged on the Y-axis. Therefore, it is possible to confirm accurately the position of the magnet 3 in the X-axis and Y-axis directions based on the outputs of the hall elements 5-1 through 5-4.

Figure 3:
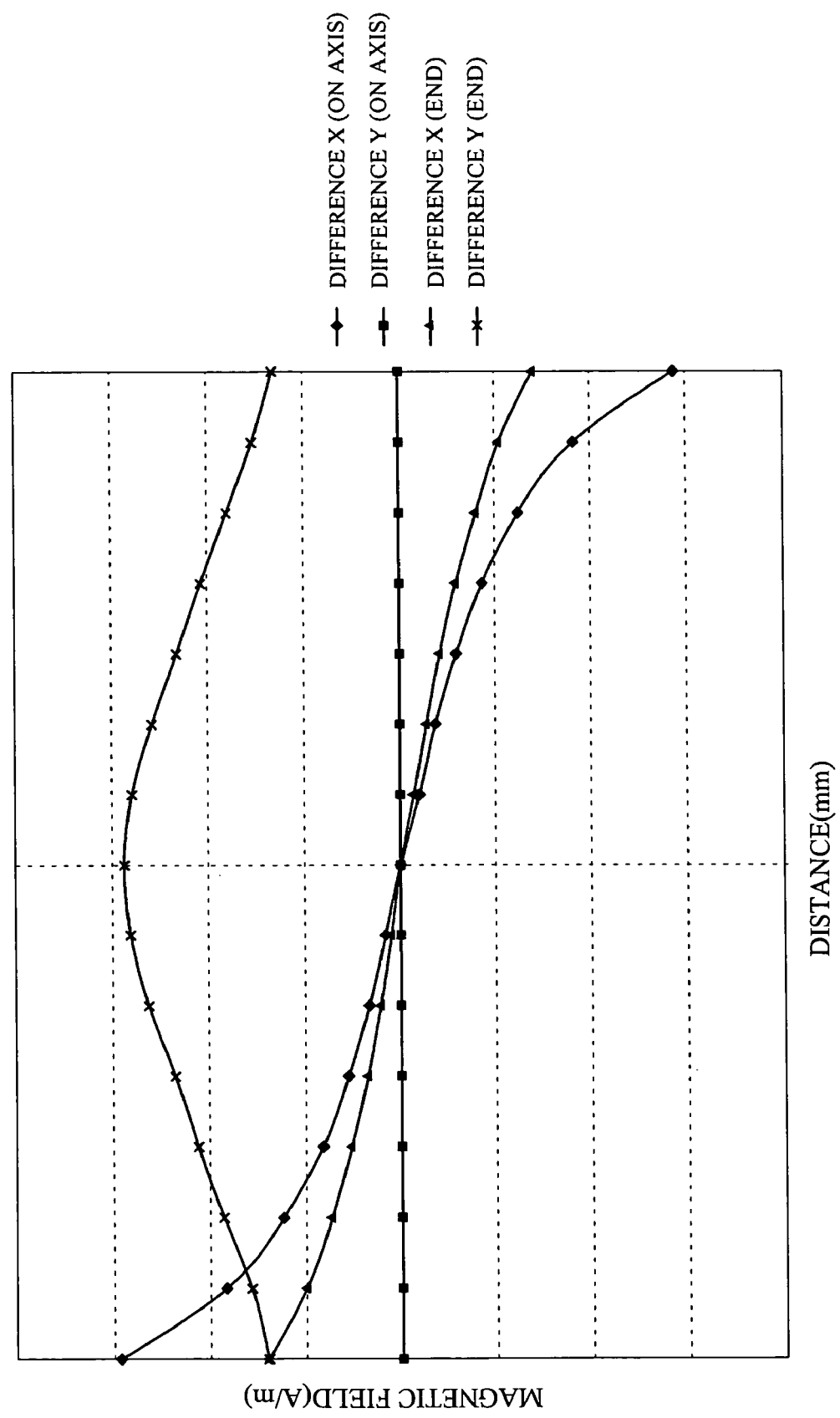
FIG. 3 illustrates example outputs of hall elements when the magnet is transferred in the input device in accordance with the first embodiment.

FIG. 3 illustrates example outputs of the hall elements when the magnet 3 moves. FIG. 3 illustrates example outputs when the magnet 3 moves from one end to the other end on the X-axis. This figure illustrates a change of the magnetic field (A/m) detected according to the outputs of the four hall elements 5-1 through 5-4 with respect to positions of the magnet 3, whenever the magnet 3 moves. In FIG. 3, a difference Y (on the Y-axis) denotes a change in the magnetic field detected based on the difference in the output between the hall element 5-1 and that of the hall element 5-3 when the center of the magnet 3 moves on the X-axis. When the center of the magnet 3 moves on the X-axis, the intensity of the magnetic field covering the hall elements 5-1 is substantially the same as that covering the hall element 5-3. In addition, the intensity hardly changes. The difference Y (on the Y-axis) is approximately zero in FIG. 3, and this shows accurate detection of the hall element 5-1 and the hall element 5-3. In contrast, a subtraction X (on the X-axis) denotes a change in the magnetic field based on the difference between the output of the hall element 5-2 and that of the hall element 5-4. When the magnet 3 moves on the X-axis, the magnetic field detected by one hall element decreases and the magnetic field detected by the other hall element increases. This difference X (on the X-axis) accurately exhibits that the magnetic field is zero on the position in which the magnet 3 cuts across the Y-axis because the magnet 3 is positioned at the center between the hall element 5-1 and the hall element 5-4, and then the direction of the magnetic field is reversed. Thus, it is possible to learn that the hall element 5-2 and the hall element 5-4 are accurately detected. In addition, the difference Y (an end) denotes the change in the magnetic field based on the difference between the output of the hall element 5-1 and that of the hall element 5-3, in the case where the magnet 3 moves parallel to the X-axis, approaching a top of the Y-axis (the end of +Y side in FIGS. 1A through 1C). In this case, the difference X (another end) denotes a change in the magnetic field based on the difference between the output of the hall element 5-2 and that of the hall element 5-4. It is possible to confirm the position of the magnet 3 by using the outputs from the four hall elements 5-1 through 5-4, with reference to FIG. 3.

The input device 1A detects the magnetic field MF substantially parallel to the Z-axis generated outside of the magnet 3, and the input device 1A has a simple structure and is different from an existing device having a magnetic yoke provided on the hall element 5. Therefore, it is possible to reduce the thickness and the size of the input device 1A. In addition, the magnet 3 may be, what is called, a permanent magnet or an electromagnet. Although, as a preferred form of the invention, the input device 1A detects the position of the magnet 3 more accurately by arranging two hall elements on the X-axis and two hall elements on the Y-axis, it is possible to detect the position of the magnet 3 by using the two hall elements in total. This means that one hall element is provided in each direction.

Figure 4:
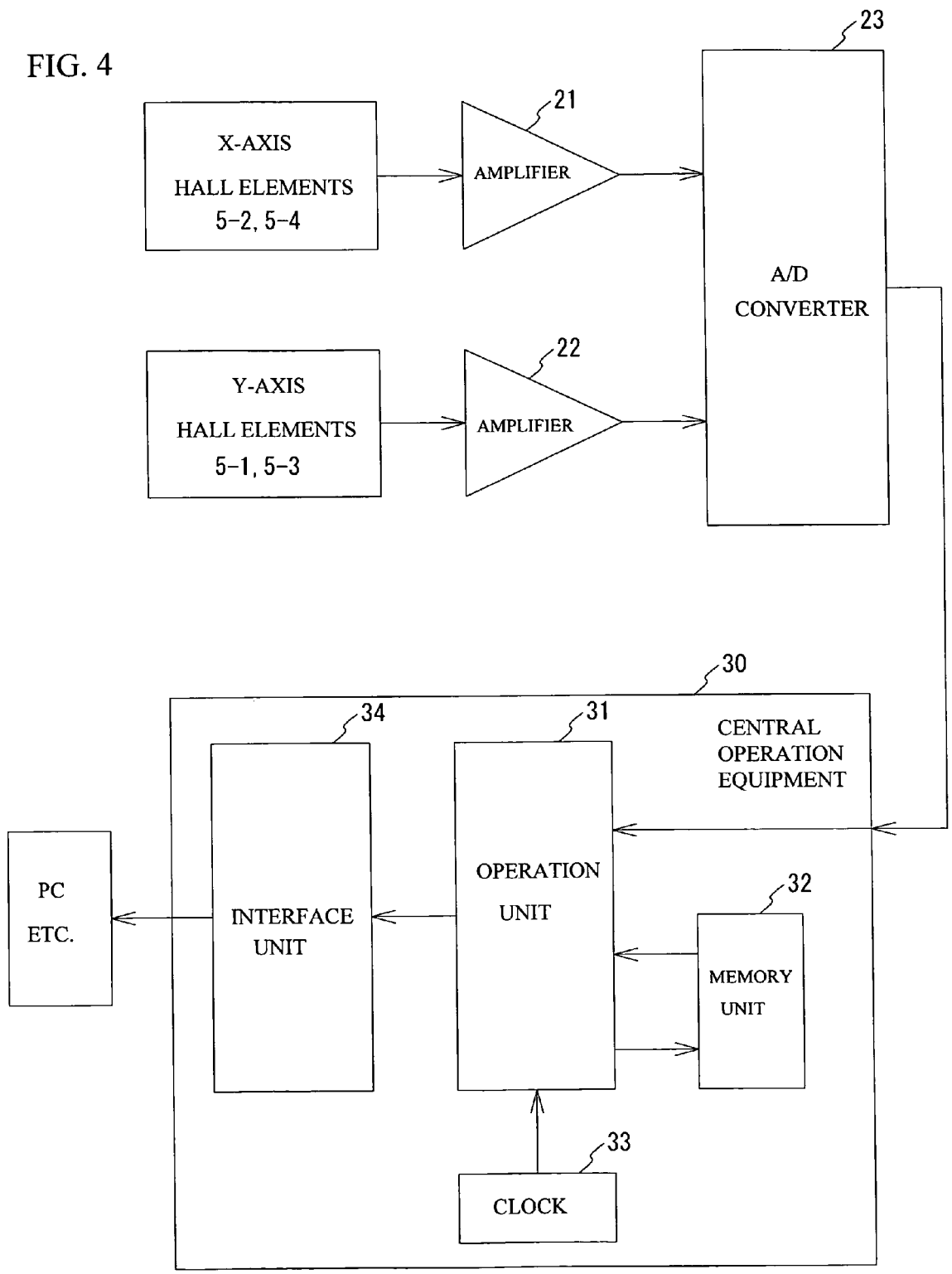
FIG. 4 illustrates a block diagram schematically showing an electric configuration example of the input device in accordance with the first embodiment.

FIG. 4 illustrates a block diagram schematically showing an electric configuration example of the input device 1A. In the configuration like this, a circuit part is, for example, arranged on the support plate 6 or the bottom plate 2BT (with reference to FIGS. 1A through 1C). Detection signals from the hall elements 5-2 and 5-4 arranged on the X-axis are supplied to an amplifier 21. Detection signals from the hall elements 5-1 and 5-3 arranged on the Y-axis are supplied to an amplifier 22. A signal of output difference is amplified by the amplifiers 21 and 22, and is provided through an A/D converter 23 to a central operation equipment 30. The central operation equipment 30 is, for example, mainly constructed of an operation unit 31 having a CPU (central processing unit). The operation unit 31 is connected to a memory unit 32 and a clock 33, and is connected through an interface unit 34 to an external unit like a personal computer ("PC"), to be provided with an input signal. The memory unit 32 can include a read-only-memory ("ROM") and a random-access-memory ("RAM"). The ROM stores, for example, a program to detect the position of the magnet 3 based on the signals detected by the hall elements 5-1 through 5-4, data associated with the program and so on. The operation unit 31 calculates the position of the magnet 3 by using the program, the data and so on. A user, for example, moves the operating unit 10 connected to the magnet 3, and it is possible to input the coordinate position to a display of the PC connected to the input device 1A. In addition, the input device 1A may be mounted on a device such as a mouse or keyboard. In this case, a CPU of the device may be used as the central operation equipment 30, and it is possible to promote to simplify and miniaturize the input device 1A.

A description has been given of the case where the input device 1A uses the magnet 3 in which the magnetic poles are arranged above and below in the Z-axis direction. However, the magnetization form of the magnet 3 is not limited to one described above. The magnetic field along the Z-axis, which is necessary for the hall elements 5-1 through 5-4 to detect the movement of the magnet 3, may actually exist outside of the magnet 3. Therefore, the magnetic form of the magnet 3 is not limited in particular. In addition, in the input device 1A, the support plate 6 is secured on the bottom plate 2BT and the hall elements 5-1 through 5-4 are secured on the bottom plate 2BT through the support plate 6. The hall elements 5-1 through 5-4, however, may be secured on the bottom plate 2BT in some other structures. That is, as an example, the substrate is composed of the bottom plate 2BT and the support plate 6 secured thereon in the input device 1A, but the bottom plate 2BT is composed of the substrate without the support plate 6.

Second Embodiment

Figure 5A:
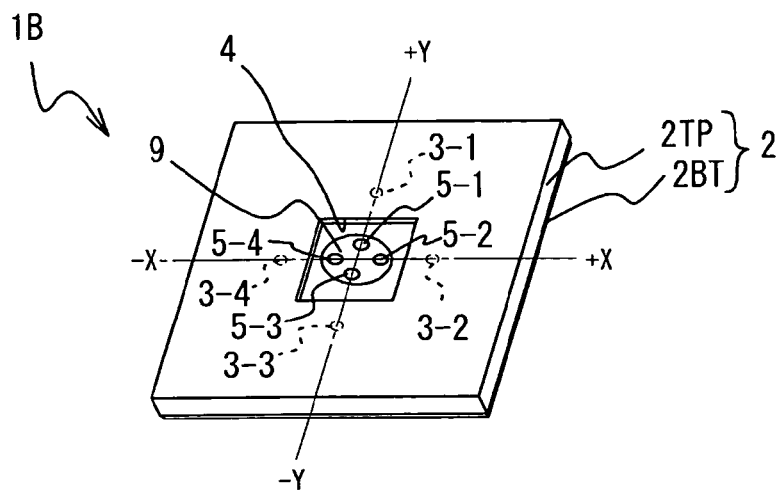
FIGS. 5A through 5C illustrate an input device in accordance with a second embodiment of the present invention.
Figure 5B:
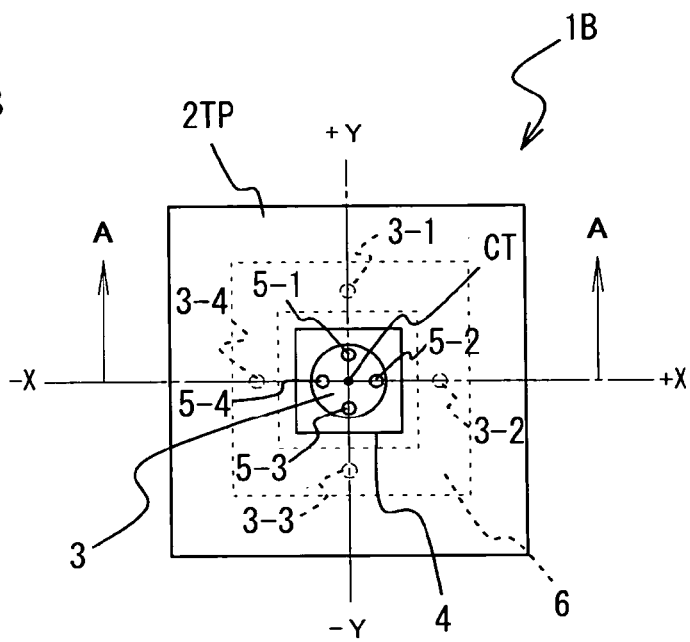
Figure 5C:
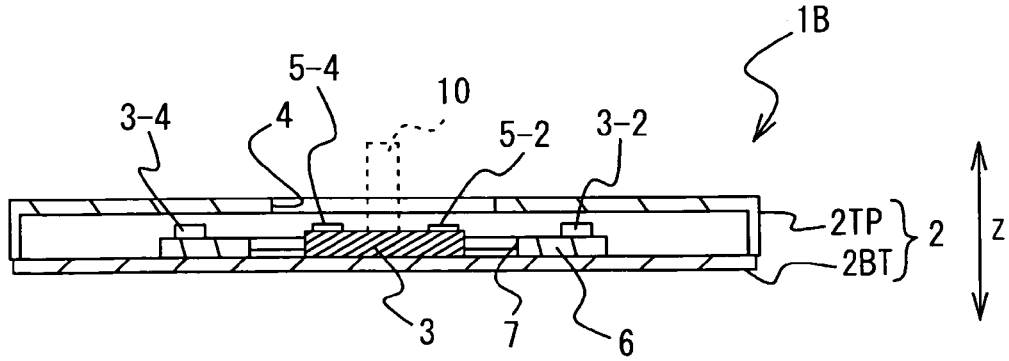

FIGS. 5A through 5C illustrate an input device 1B in accordance with a second embodiment of the present invention. The input device 1B has a structure in which the positions of the magnet 3 and the hall element 5 are switched in the structure of the input device 1A in accordance with the first embodiment. In the second embodiment, the same components and configurations as those of the first embodiment have the same reference numerals and a detailed explanation will be omitted. In addition, a numeral 3 is used for the magnet, and additional numerals such as 3-1 through 3-4 are employed, when there are more than one magnet. In a similar way, a numeral 5 is used for the hall element, and additional numerals such as 5-1 through 5-4 are employed, when there are more than one hall element. The additional numerals are also employed in the other embodiments as necessary.

In the input device 1B shown in FIGS. 5A through 5C, a movable object 9 is provided in the cutout 4 of a cover member 2TP. This movable object 9 has a disc shape and keeps the four hall elements 5-1 through 5-4. In addition, although the magnet 3 itself can slide on the bottom plate 2BT as a movable object in the first embodiment, the hall elements 5-1 through 5-4 can move around when the movable object 9 slides.

Four magnets 3-1 through 3-4 are arranged on the support plate 6. The magnets 3-1 through 3-4 are arranged, for example, to be equally distant from the center CT, which is the center of the hall elements 5-1 through 5-4 in the input device 1A in accordance with the first embodiment. The magnets 3-1 through 3-4 are respectively magnetized so that the direction of the magnetic field is arranged along the Z-axis as well as the magnet 3 in accordance with the first embodiment (with reference to FIGS. 2A and 2B). Therefore, the magnetic fields are formed substantially parallel to the Z-axis respectively outside the magnets 3-1 through 3-4. And the hall elements 5-1 through 5-4 are retained by the movable object 9 to respectively correspond to the magnets 3-1 through 3-4.

In the input device 1B, relative positions between the hall elements 5-1 through 5-4 and the magnets 3-1 through 3-4 change when the position of the movable object 9 retaining the hall elements 5-1 through 5-4 is rearranged. Therefore, also with the input device 1B, it is possible to input an instruction to a computer or the like by using signals of the hall elements 5 when an operator moves the movable object 9 by using the operating unit 10. In the input device 1B, the magnetic fields generated outside the magnets 3-1 through 3-4 are detected by the hall elements 5-1 through 5-4 arranged at approximately the same level in height, and it is possible to reduce the thickness and the size of the input device 1B.

Third Embodiment

Figure 6A:
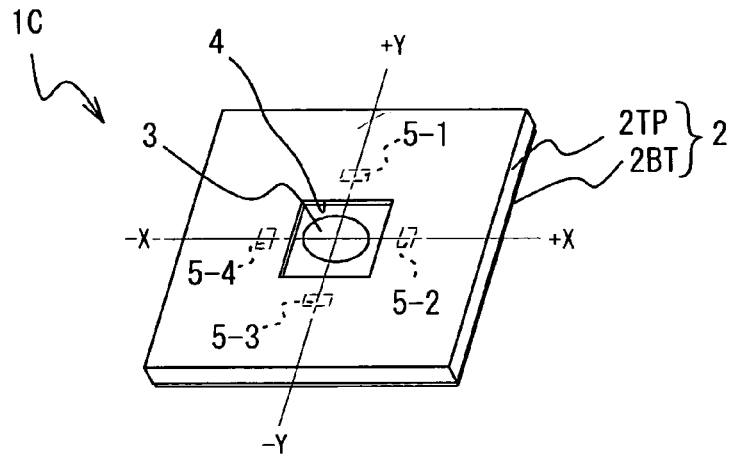
FIGS. 6A through 6C illustrate an input device in accordance with a third embodiment of the present invention.
Figure 6B:
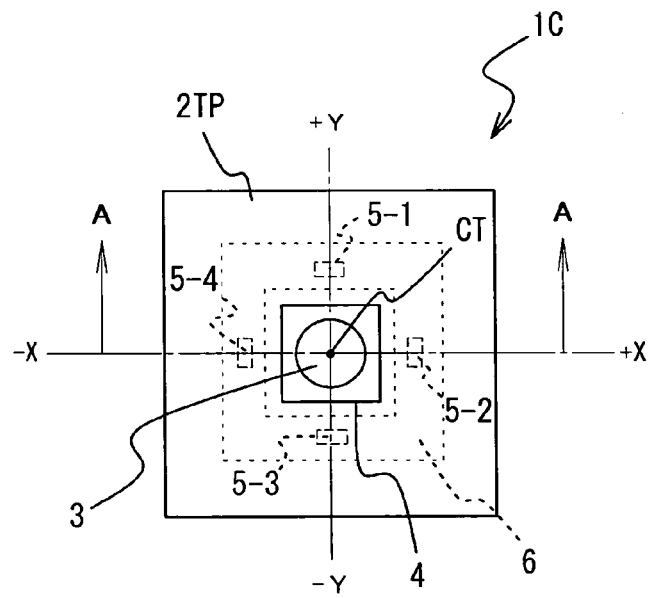
Figure 6C:
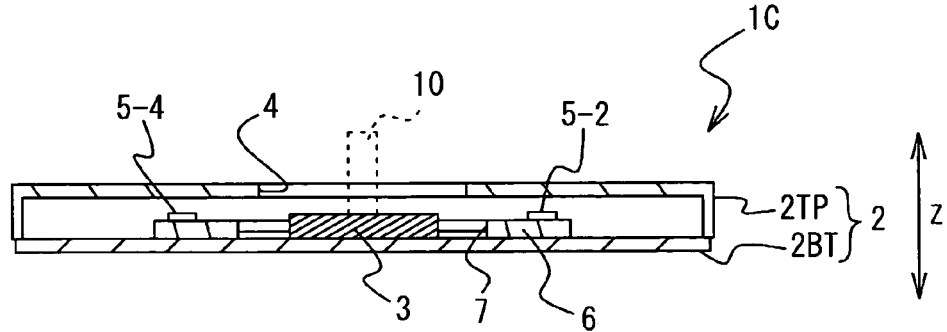
Figure 7:
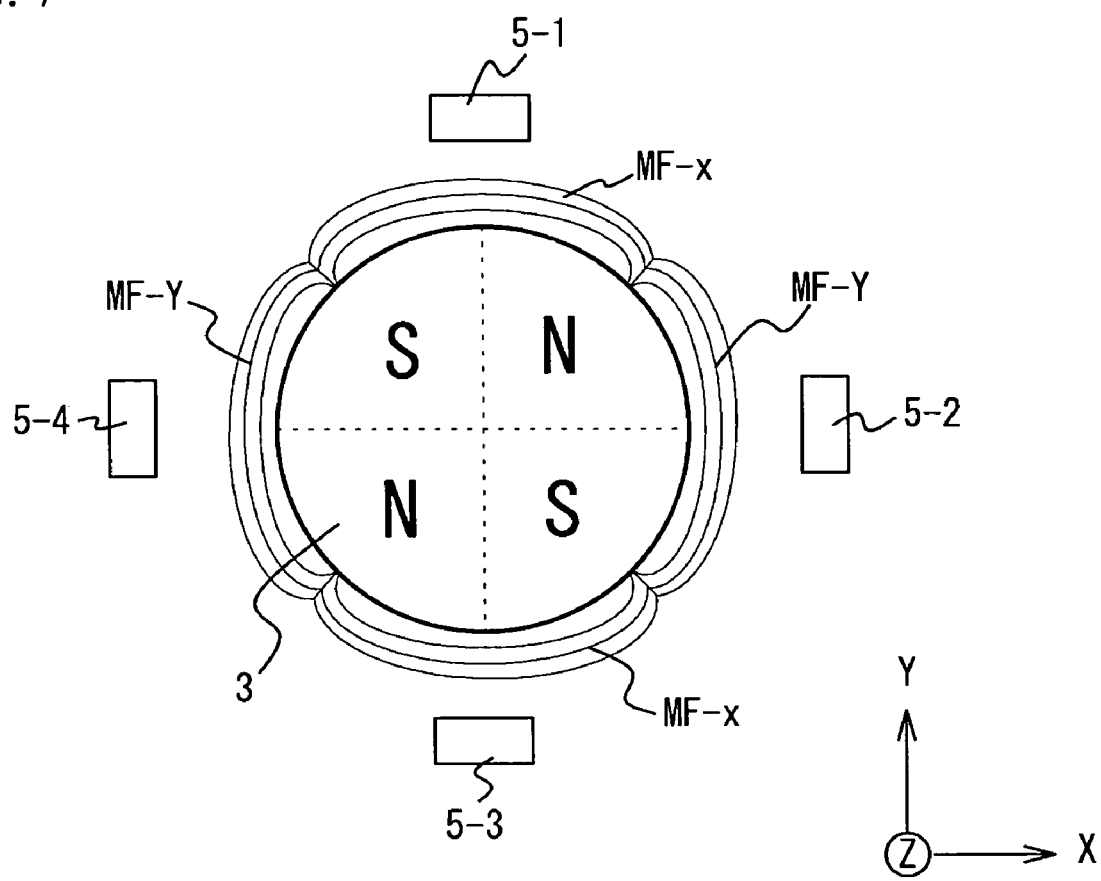
FIG. 7 illustrates a view showing a frame format of the relationship between magnets and hall elements in the input device in accordance with the third embodiment.

A description will be given of an input device 1C in accordance with a third embodiment of the present invention with reference to FIGS. 6A through 6C and FIG. 7. Although the hall element 5 is arranged to detect a magnetic field parallel to the Z-axis direction in the first and the second embodiments described above, a hall element in accordance with the third embodiment is arranged to detect a magnetic field parallel to the X-Y plane. FIGS. 6A through 6C illustrate the input device 1C in accordance with the third embodiment. FIG. 7 illustrates a view showing a frame format of a relationship between the magnet and hall elements.

As is shown in FIG. 7, the magnet 3 employed in the input device 1C is magnetized so that two north poles and two south poles are provided alternately on the X-Y plane. That is, the magnet 3 has four magnetic poles. The magnetic field MF parallel to the X-Y plane is generated outside the magnet 3. In this input device 1C, which is different from the input device 1A and 1B above, the four hall elements 5-1 through 5-4 are arranged to lay down so as to detect the magnetic field parallel to the X-Y plane. As is shown in FIG. 7, the hall elements 5-1 and 5-3 are arranged to detect a magnetic field MF-x substantially parallel to the X-axis, and the hall elements 5-2 and 5-4 are arranged to detect a magnetic field MF-y substantially parallel to the Y-axis.

The input device 1C also has a structure in which the hall elements 5-1 through 5-4 arranged at substantially the same positions as the magnet 3 detect magnetic fields generated outside the magnet 3. Therefore, it is possible to reduce the thickness and the size of the input device 1C, as well as the input device 1A. In addition, the input device 1C can detect accurately the position of the magnet 3 serving as a movable object, based on difference in the signals from two hall elements respectively provided on the X-axis and on the Y-axis. However, it is also possible to detect the magnet 3 by providing one hall element on the X-axis and on the Y-axis respectively.

Fourth Embodiment

Figure 8A:
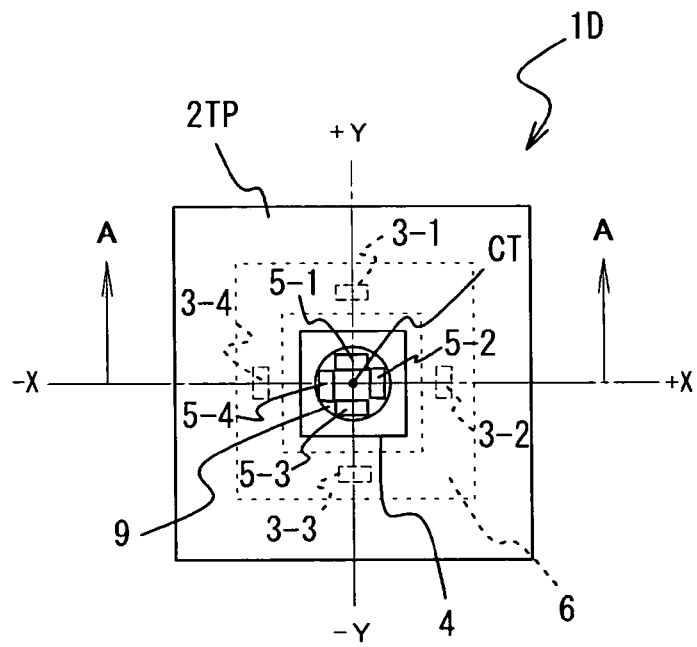
FIGS. 8A through 8C illustrate an input device in accordance with a fourth embodiment of the present invention.
Figure 8B:
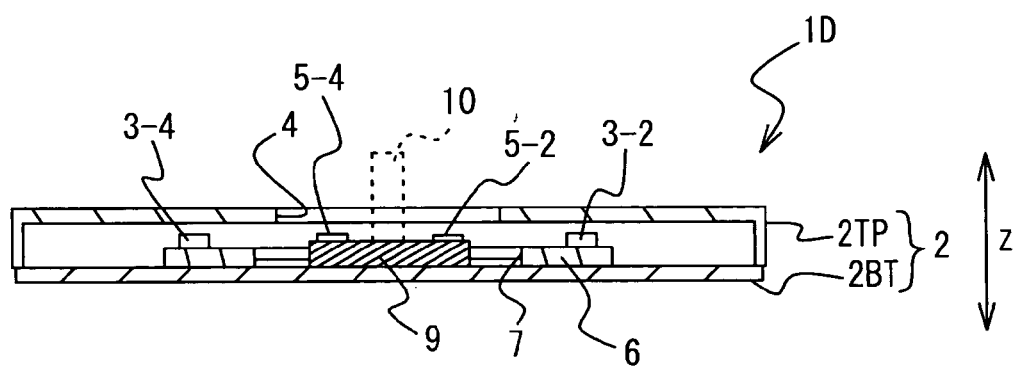
Figure 8C:
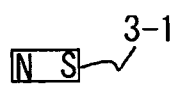
Figure 8C:
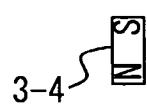
Figure 8C:
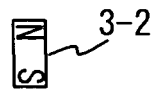
Figure 8C:
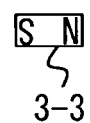

FIGS. 8A through 8C illustrate an input device 1D in accordance with a fourth embodiment of the present invention. FIG. 8A illustrates a top view of the input device 1D. FIG. 8B illustrates a cross sectional view taken along a line A-A shown in FIG. 8B. FIG. 8C illustrates an arrangement example of the magnets. The input device 1D has a structure in which the positions of the magnet 3 and the hall elements 5 are switched in the structure of the input device in accordance with the third embodiment. Four hall elements 5-1 through 5-4 are arranged on the movable object 9 to detect a magnetic field parallel to the X-Y plane. On the other hand, the four magnets 3-1 through 3-4 are arranged on the support plate 6. These magnets 3-1 through 3-4 are magnetized so that directions of the magnetic fields are parallel to the X-Y plane as illustrated in FIG. 8C. Therefore, magnetic fields substantially vertical to the Z-axis are formed respectively outside the magnets 3-1 through 3-4. The hall elements 5-1 through 5-4 are arranged to correspond to the magnets 3-1 through 3-4 respectively.

It is possible to reduce the thickness and the size of the input device 1D as well as the input device 1A, because the hall elements 5-1 through 5-4, arranged on the substantially same level in height as the magnets 3, detect the magnetic fields respectively generated outside the magnets 3. In addition, this input device 1D may have a simplified structure in which one hall element is arranged on the X-axis and on the Y-axis respectively.

Fifth Embodiment

Figure 9A:
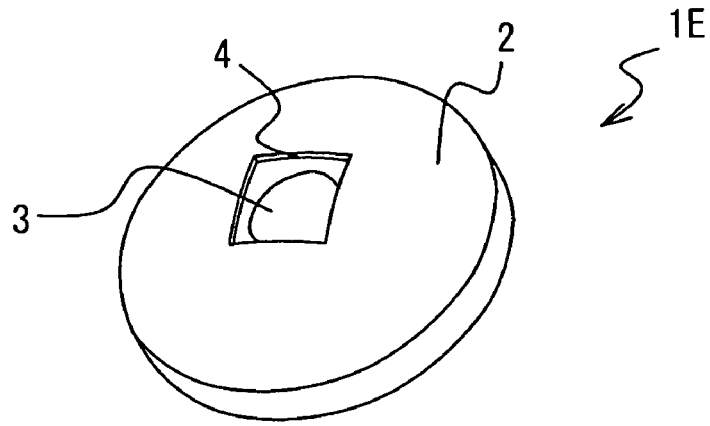
FIGS. 9A through 9D illustrate an input device in accordance with a fifth embodiment of the present invention.
Figure 9B:
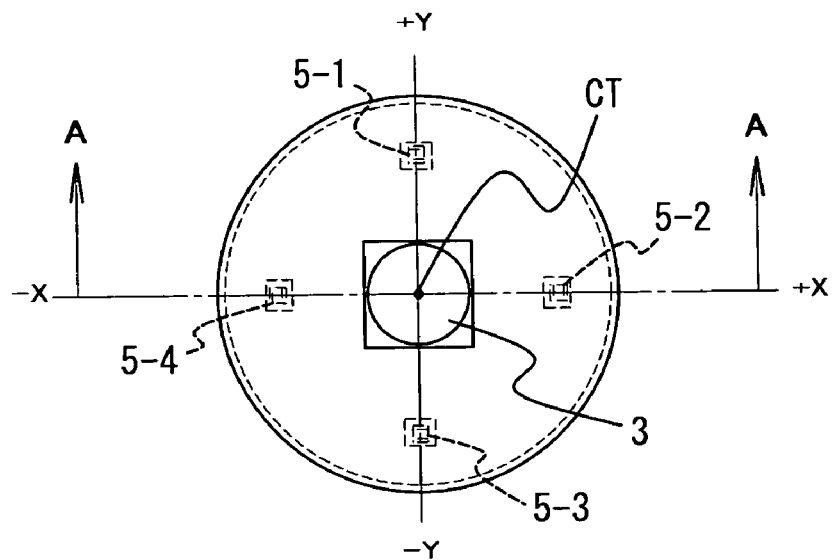
Figure 9C:
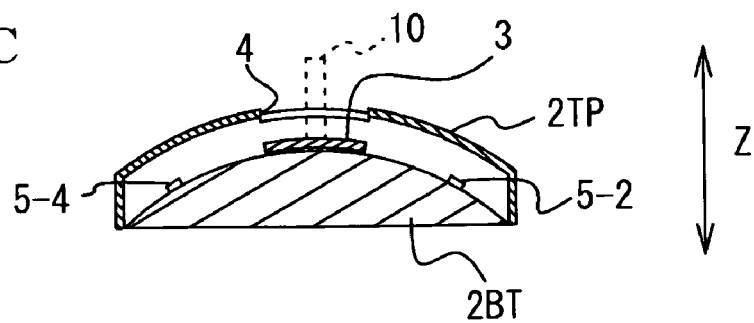
Figure 9D:
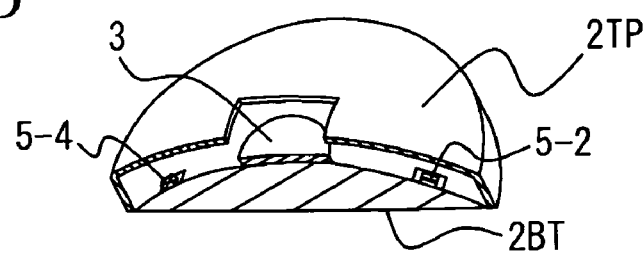
Figure 10A:
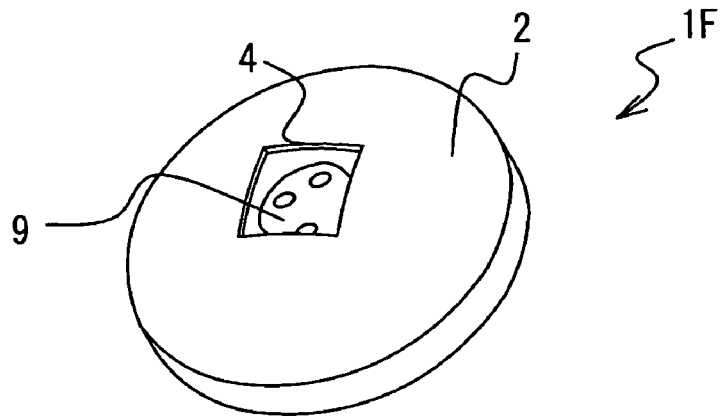
FIGS. 10A through 10D illustrate an input device in accordance with a sixth embodiment of the present invention.
Figure 10B:
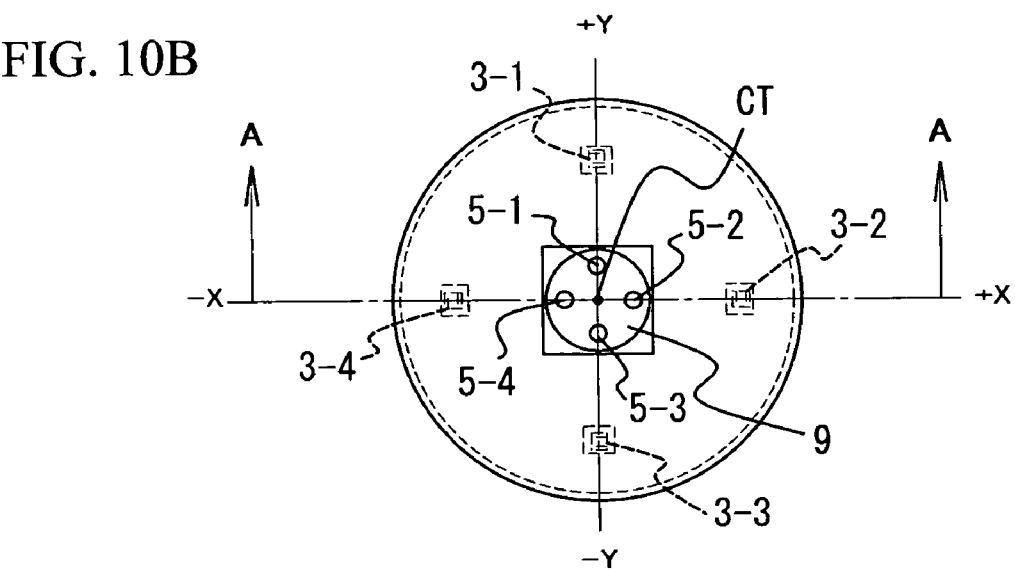
Figure 10C:
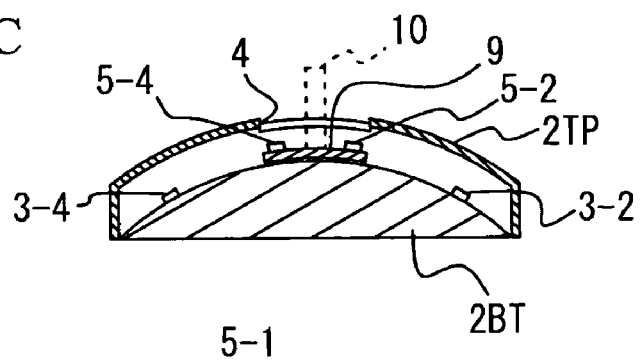
Figure 10D:
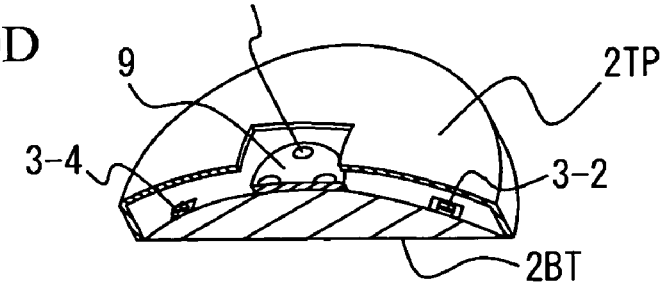

FIGS. 9A through 9D illustrate an input device 1E in accordance with a fifth embodiment of the present invention. FIG. 9A illustrates a perspective view of an exterior of the input device 1E. FIG. 9B illustrates a top view of the input device 1E. FIG. 9C illustrates a cross-sectional view taken along a line A-A in FIG. 9B. FIG. 9D illustrates a perspective view of an exterior of FIG. 9C.

Although the chassis 2 of the input device 1A through 1D described above has a polygonal shape, an exterior of the chassis 2 of the input device 1E is configured to have a shape of dome. The upper side of the bottom plate 2BT is curved to be semispherical, with the top of the bottom plate 2BT being the center of a cutout 4. The magnet 3 is initially arranged at the center CT of the cutout 4. The lower surface of the magnet 3 is curved corresponding to the upper surface of the bottom plate 2BT, and the magnet 3 is arranged to be capable of sliding on the bottom plate 2BT.

The magnet 3 may be magnetized above and below in the z-axis direction shown in FIGS. 2A and 2B, or may be magnetized to form multiple magnetic fields on the X-Y plane shown in FIG. 7. In the case where the magnet 3 is configured as shown in FIGS. 2A and 2B, the four hall elements 5-1 through 5-4 are arranged to detect a magnetic field vertical to the upper surface of the bottom plate 2BT. In addition, although the hall elements 5-1 through 5-4 are arranged to surround the magnet 3 serving as a movable object in this embodiment, the magnet 3 is arranged in an upper position in the Z-axis direction (in height) than those of the hall elements. This is different from the embodiments described above. The hall elements 5-1 through 5-4 are, however, arranged equally distant from the center CT on the same X-Y plane as in the embodiments described above. In addition, in the case where the magnet 3 is configured as shown in FIG. 7, the four elements 5-1 through 5-4 are arranged to detect a magnetic field tangential to the upper surface of the bottom 2BT.

In the input device 1E, the signals are output from the hall elements 5-1 through 5-4 based on the position of the magnet 3, as well as the embodiments described above. In addition, although this input device 1E is thicker than those of the embodiments described above, yet still, it is possible to reduce the thickness, as compared to the conventional input devices having a shape of dome.

Sixth Embodiment

FIG. 10 illustrates an input device 1F in accordance with a sixth embodiment of the present invention. FIG. 10A illustrates a perspective view of an exterior of the input device 1F. FIG. 10B illustrates a top view of the input device 1F. FIG. 10C illustrates a cross-sectional view taken along a line A-A in FIG. 10B. FIG. 10D illustrates a perspective view of an exterior of FIG. 10C. This input device 1F has a structure in which the positions of the magnet 3 and the hall elements 5 are switched in the structure of the input device 1E in accordance with the fifth embodiment.

In the input device 1F shown in FIGS. 10A through 10D, a movable object 9 is arranged in the cutout 4 of the cover member 2TP. This movable object 9 is formed to correspond to the semispherical bottom plate 2BT. Four hall elements 5-1 through 5-4 are retained on the movable object 9. In addition, although the magnet 3 itself slides on the bottom plate 2BT as a movable object, the positions of the hall elements 5-1 through 5-4 change when the movable object 9 slides.

Four magnets 3-1 through 3-4 may be magnetized in the z-axis direction shown in FIGS. 2A and 2B, or may be magnetized on the X-Y plane to form multiple magnetic fields as shown in FIG. 7, as described in the fifth embodiment. In accordance with the configuration of the selected magnet, the hall elements 5-1 through 5-4 may be arranged to detect a magnetic field vertical to the upper surface of the bottom plate 2BT or a magnetic field tangential to the upper surface of the bottom plate 2BT. This input device 1F has the same effect as the fifth embodiment described above.

The magnet 3 may be a permanent magnet or an electromagnet, concerning the embodiments 1 through 6 described above. In addition, although it is demonstrated that a magnet itself moves around in a configuration in which a movable object arranged in the cutout 4 retains the magnet 3 as described above, a structure may be employed in which a plurality of magnets are arranged on the movable object 9 as in the case of the hall elements. In this case, it is possible to reduce the quantity of the magnets for use. In addition, although there has been demonstrated a case where the hall elements are used as electromagnetic conversion elements in the above-mentioned embodiments, a magnetoresistance-effect-element ("MR element") can be employed instead of the hall elements.

In the embodiments described above, a hall element serving as an electromagnetic conversion element detects a magnetic field generated from a magnet serving as a magnetic field generator, and the position of a movable object is thus confirmed. An embodiment below is a case where a photoelectric conversion element detects a light emitted by a luminous object and the position of the movable object is confirmed. In addition, in a seventh embodiment and later, the same components and configurations as those of the first embodiment have the same reference numerals and a detailed explanation will be omitted.

Seventh Embodiment

Figure 11A:
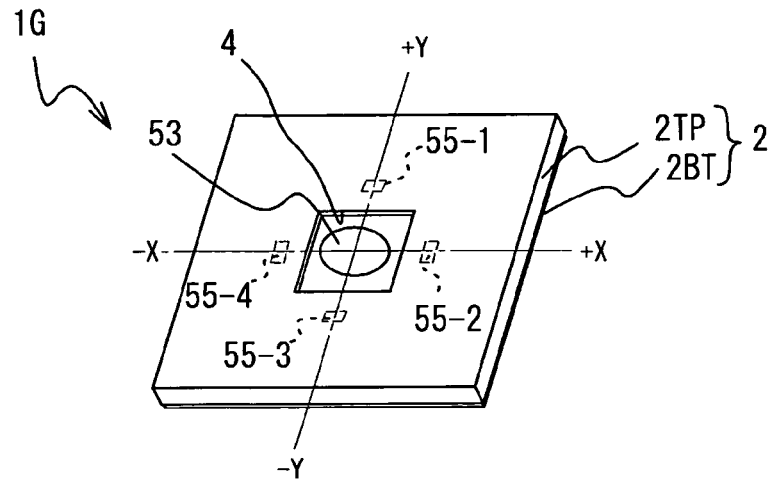
FIGS. 11A through 11C illustrate an input device in accordance with a seventh embodiment of the present invention.
Figure 11B:
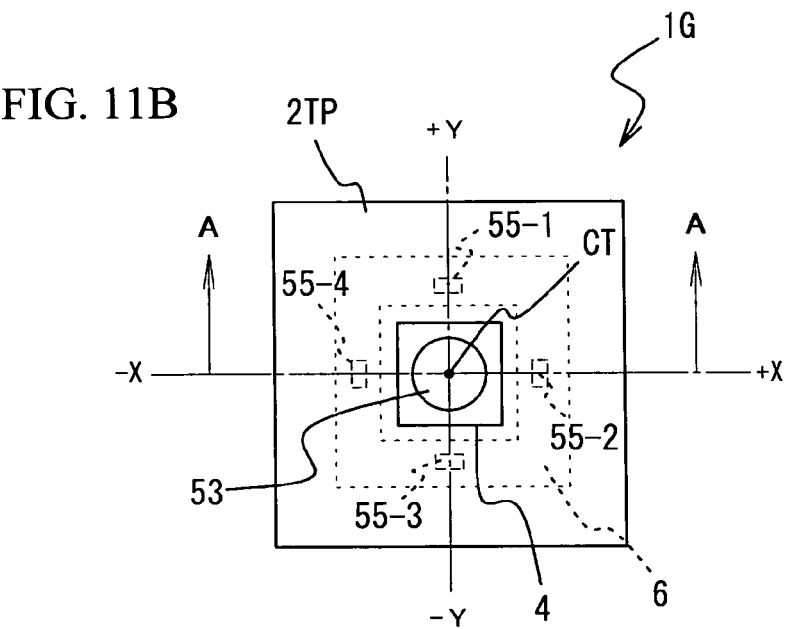
Figure 11C:
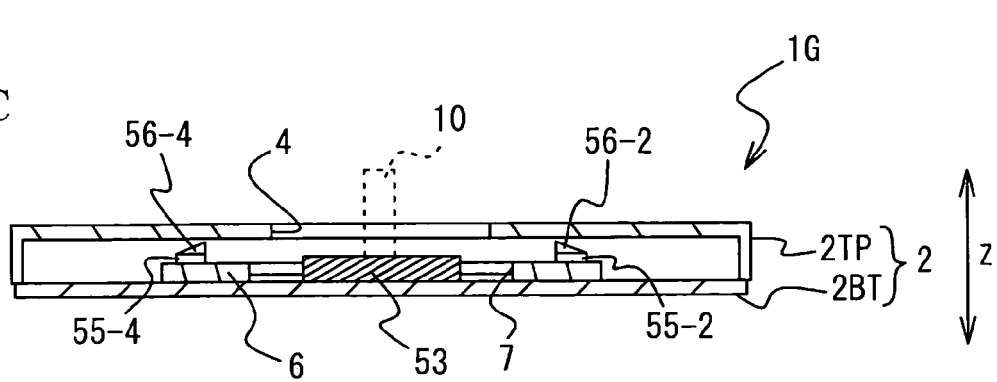

FIGS. 11A through 11C illustrate an input device 1G in accordance with the seventh embodiment of the present invention. FIG. 11A illustrates a perspective view of an exterior of the input device 1G. FIG. 11B illustrates a top view of the input device 1G. FIG. 11C illustrates a cross-sectional view taken along a line A-A in FIG. 11B. The input device 1G has a Light Emitting Diode ("LED") 53 serving as a generator and four photodiodes 55-1 through 55-4 in the chassis 2. The LED 53 emits an infrared light, an ultraviolet light or the like along the bottom plate 2BT. The input device 1G is different from the input device 1A in accordance with the first embodiment in that the LED 53 replaces the magnet 3 and the photodiodes 55 replaces the hall elements 5. In the input device 1A, the position of the movable object is confirmed by detecting the magnetic field intensity of the magnet 3. In contrast, in the input device 1G, the position of a movable object is confirmed by detecting the light intensity emitted from the LED 53.

Prisms 56-1 through 56-4, functioning as photoderivative members, are respectively mounted on the photodiodes 55-1 through 55-4 in the input device 1G as is shown in FIG. 11C. These prisms 56-1 through 56-4 receive lights emitted by the LED 53 and guide those into acceptance surfaces of the photodiodes 55-1 through 55-4 by compulsion. The acceptance surfaces of the prisms 56-1 through 56-4 are arranged vertical to the bottom plate 2BT. The conventional input device is configured to be capable of assuring a light path where a light reflects, and the conventional input device is thick in the Z-axis direction. It is possible, however, to reduce the thickness of the input device 1G, because it is not necessary to provide the light path like this and the positions of the photodiodes 55-1 through 55-4 are configured substantially same as that of the LED 53. Further, the input device 1G does not need any member like a reflection board to constitute the light path, and it is possible to simplify the configuration and to promote miniaturization.

Figure 12:
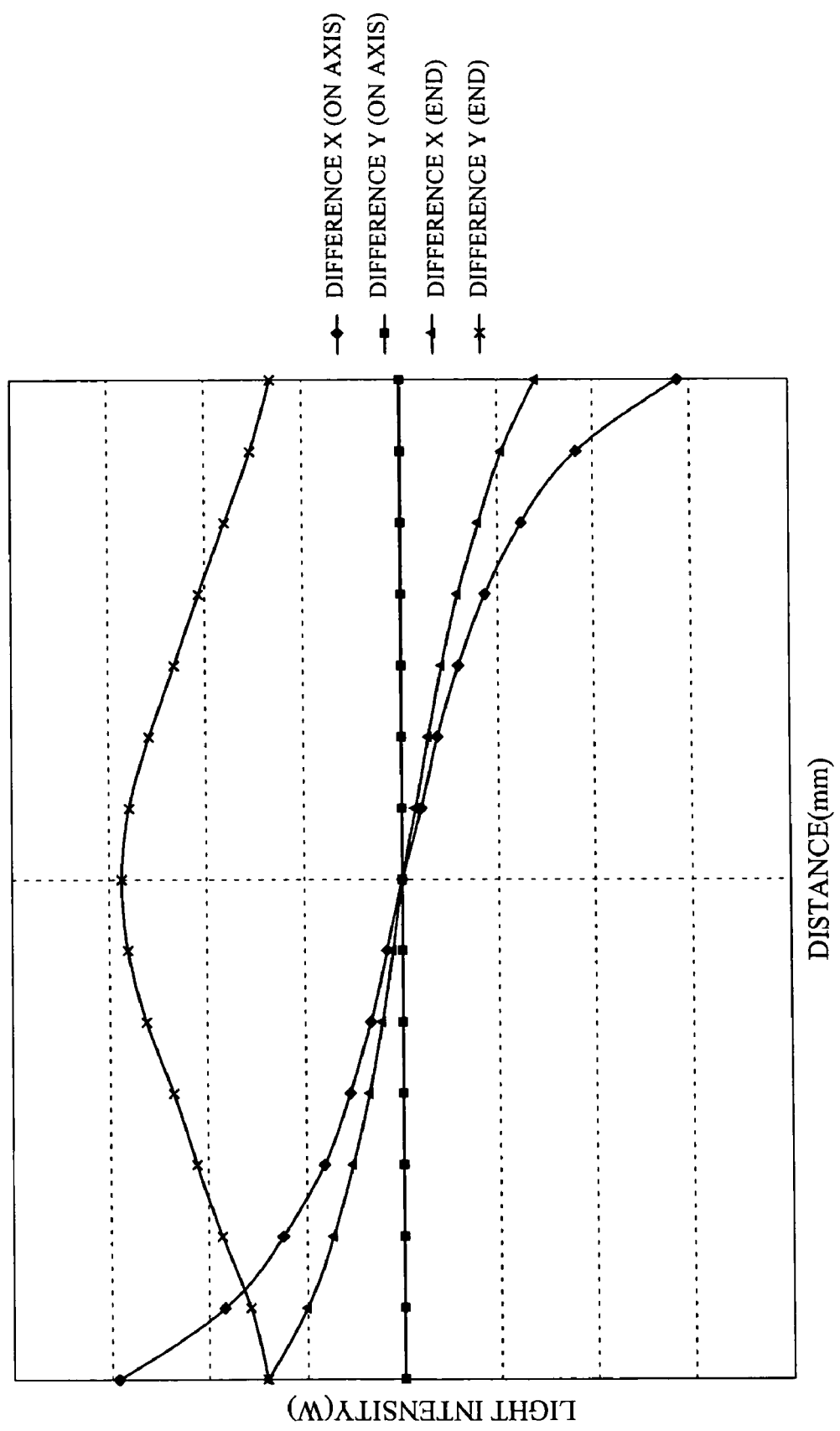
FIG. 12 illustrates an example output emitted from the photodiode when the LED is transferred in the input device in accordance with the seventh embodiment.

The light emitted from the LED 53 attenuates according to the distance from the LED 53. On the other hand, the photodiodes 55-1 through 55-4 output signals according to the light intensity. Therefore, it is possible to confirm the position of the LED 53 based on the signals from the photodiodes 55-1 through 55-4. FIG. 12 illustrates an example output from the photodiode 55 when the LED 53 moves. FIG. 12 illustrates an example output in a case where the LED 53 moves from one end to the other end on the X-axis. A result shown in FIG. 12 is the same as that of FIG. 3 above, and the light intensity estimated based on the outputs obtained from the four photodiodes 55-1 through 55-4, is shown with respect to the positions of the LED 53. It is possible to confirm that the position of the LED 53 can be detected by using the outputs of the four photodiodes 55-1 through 55-4.

Figure 13:
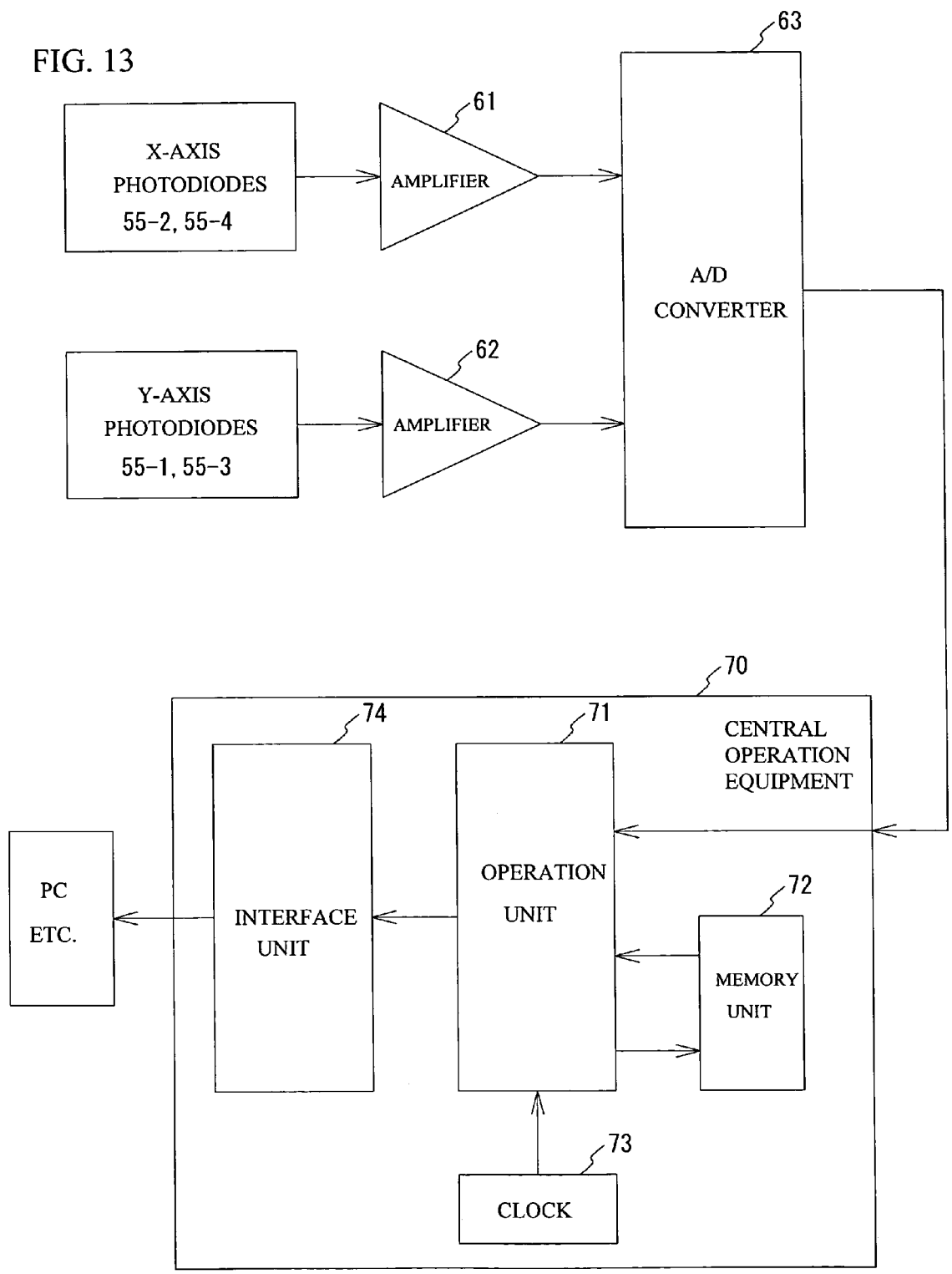
FIG. 13 illustrates a block diagram schematically showing an electric configuration example of the input device in accordance with the seventh embodiment.

FIG. 13 illustrates a block diagram schematically showing an electric configuration example for detecting the position of the LED 53 of the input device 1G. In the configuration like this, a circuit part is, for example, arranged on the support plate 6 or the bottom plate 2BT (with reference to FIGS. 11A through 11C). Detection signals from the photodiodes 55-2 and 55-4 arranged on the X-axis are supplied to an amplifier 61. Detection signals from the photodiodes 55-1 and 55-3 arranged on the Y-axis are supplied to an amplifier 62. An output difference is amplified by the amplifiers 61 and 62, and is provided to a central operation equipment 70 through an A/D converter 63. The central operation equipment 70 is, for example, mainly composed of an operation unit 71 having a CPU (central processing unit). The operation unit 71 is connected to a memory unit 72 and a clock 73, and is connected through an interface unit 74 to an external unit like a personal computer ("PC"), to be provided with an input signal. The memory unit 72 may include a read-only-memory ("ROM") and a random-access-memory ("RAM"). The ROM stores, for example, a program to detect the position of the LED 53 based on signals detected by the photodiodes 55-1 through 55-4, data associated with the program and so on. The operation unit 71 calculates the position of the LED 53 by using the program, the data and so on. In addition, the input device 1G also may be mounted on a device like a mouse or a keyboard. In this case, a CPU of the device may be used for the central operation equipment 70. It is possible to input the coordinate position to a display of the PC connected to the input device 1G, when a user moves with fingers thereof the operating unit 10 connected to the LED 53.

Eighth Embodiment

Figure 14A:
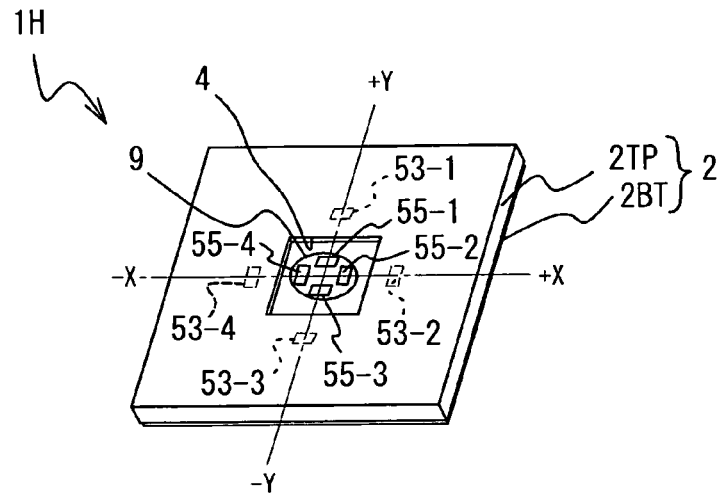
FIGS. 14A through 14C illustrate an input device in accordance with an eighth embodiment of the present invention.
Figure 14B:
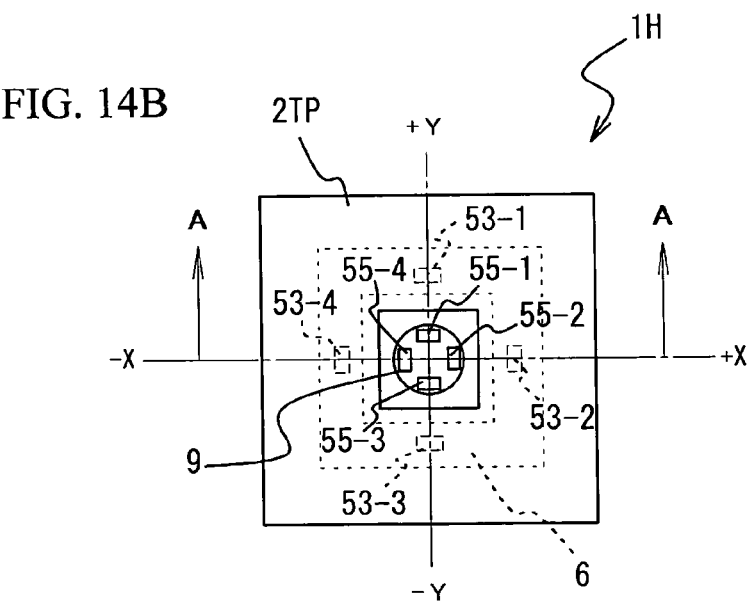
Figure 14C:
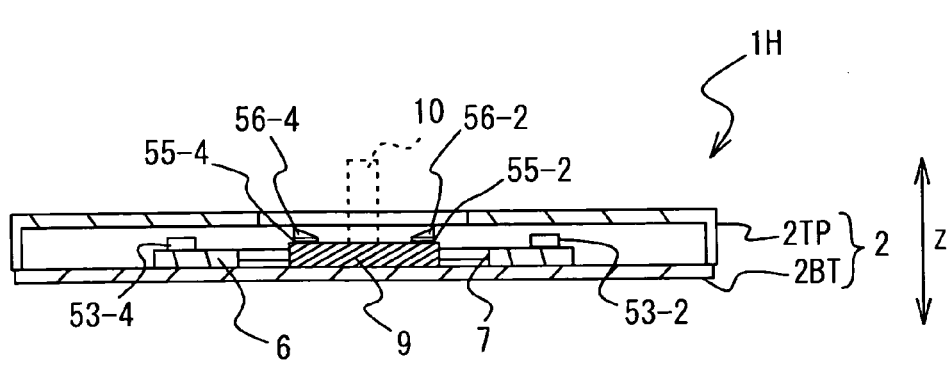

FIG. 14 illustrates an input device 1H in accordance with an eighth embodiment of the present invention. The input device 1H has a structure in which the positions of the LEDs 53 and the photodiodes 55 are switched in the input device 1G in accordance with the seventh embodiment. In the input device 1H, a movable object 9 is arranged in the cutout 4 of a cover member 2TP. This movable object 9 has a disc shape and retains the four photodiodes 55-1 through 55-4. In the eighth embodiment, the positions of the four photodiodes 55-1 through 55-4 on the plane change when the movable object 9 slides.

Four LEDs 53-1 through 53-4 are arranged on the support plate 6. The LEDs 53-1 through 5-4 are respectively arranged to emit lights toward the photodiodes 55-1 through 55-4 corresponding to the LEDs 53-1 through 53-4. It is possible to detect the position of the movable object 9, because the outputs of the photodiodes 55-1 through 55-4 change when the movable object 9 moves in the input device 1H. Therefore, the input device 1H is capable of inputting an instruction to a computer or the like by using signals when an operator moves the movable object 9 by using the operating unit 10. It is also possible to reduce the thickness and the size of the input device 1H as well as the case of the input device 1G, because the photodiodes 55-1 through 55-4 are arranged at substantially the same level in height as the LEDs 53-1 through 53-4 to detect the lights. In addition, two photodiodes are respectively arranged on the X-axis and on the Y-axis in the input device 1G, and the position of the movable object 9 is detected accurately. However, it should be appreciated that one photodiode may respectively be arranged on the X-axis and on the Y-axis.

Ninth Embodiment

FIG. 15 illustrates an input device 1I in accordance with a ninth embodiment of the present invention. FIG. 15A illustrates a perspective view of an exterior of the input device 1I. FIG. 15B illustrates a top view of the input device 1I. FIG. 15C illustrates a cross-sectional view taken along a line A-A in FIG. 15B. FIG. 15D illustrates a perspective view of an exterior of FIG. 15C. The chassis 2 of the input device 1I is configured to have a shape of dome as well as that of the input device 1E in accordance with the fifth embodiment. The upper side of a bottom plate 2BT is curved to be semispherical, with the top of the bottom plate 2BT being the center of the cutout 4. The LED 53 is initially arranged at the center CT of the cutout 4. The lower surface of the LED 53 is curved corresponding to the upper surface of the bottom plate 2BT, and the LED 53 is arranged to be capable of sliding on the bottom plate 2BT.

Figure 15A:
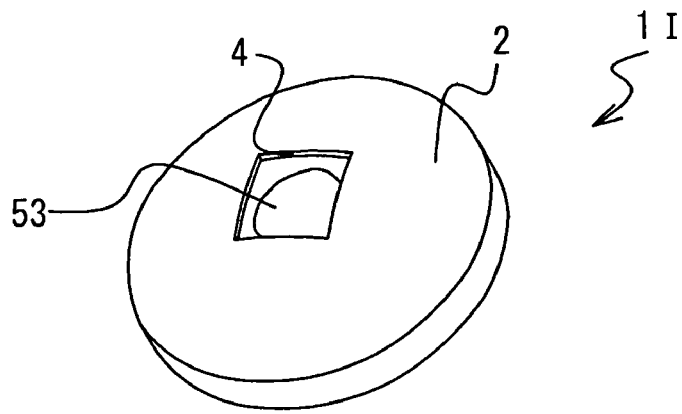
FIGS. 15A through 15D illustrate an input device in accordance with a ninth embodiment of the present invention.
Figure 15B:
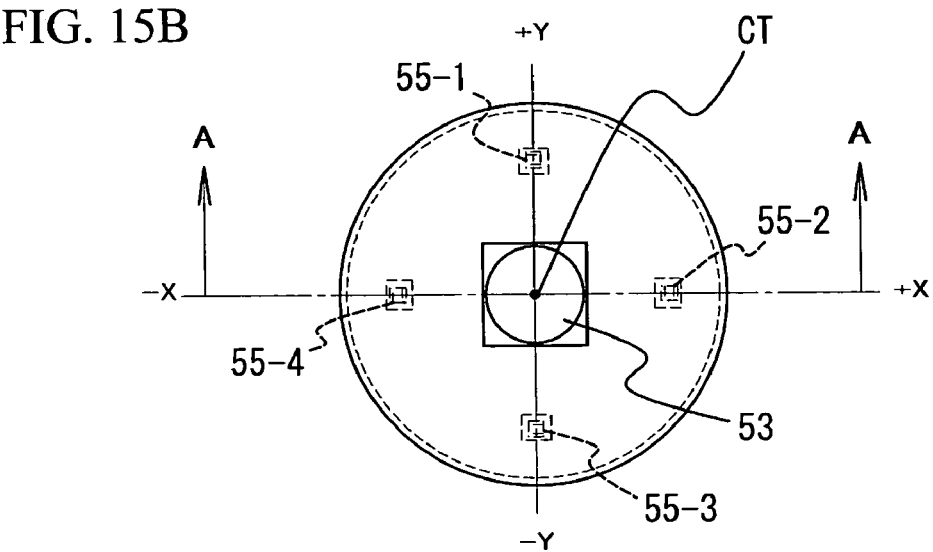
Figure 15C:
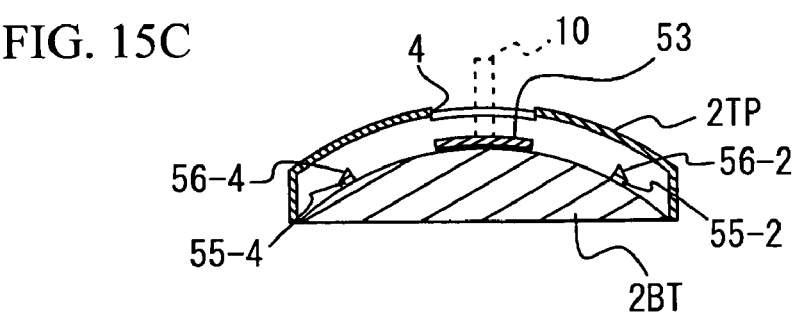
Figure 15D:
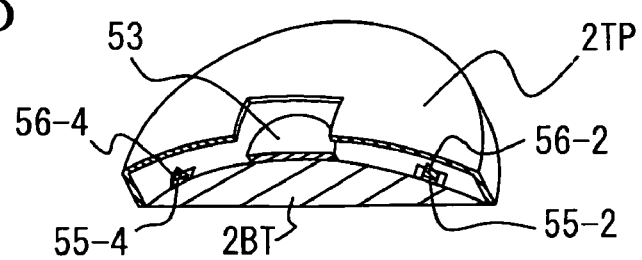

The LED 53 emits lights along the bottom plate 2BT. Prisms 56-1 through 56-4 are arranged on the four photodiodes 55-1 through 55-4 to receive the lights vertical to the upper surface of the bottom plate 2BT as shown in FIG. 15C but not shown in FIG. 15B. In addition, although the photodiodes 55-1 through 55-4 are arranged to surround the LED 53 as a movable object in this embodiment, this embodiment is different from the seventh embodiment and the eighth embodiment in the position of the photodiodes in the Z-axis direction. The photodiodes 55-1 through 55-4 are arranged equally distant from the center CT and arranged on the same X-Y plane. The input device 1I also outputs the signals from the photodiodes 55-1 through 55-4 based on the positions of the LED 53 as well as the embodiments described above.

Tenth Embodiment

FIG. 16 illustrates an input device 1J in accordance with a tenth embodiment of the present invention. FIG. 16A illustrates a perspective view of an exterior of the input device 1J. FIG. 16B illustrates a top view of the input device 1J. FIG. 16C illustrates a cross sectional view taken along a line A-A in FIG. 16B. FIG. 16D illustrates a perspective view of an exterior of FIG. 16C. The input device 1J has a structure in which the positions of the LEDs 53 and the photodiode 5 are switched in the input device 1I in accordance with the ninth embodiment. The input device 1J corresponds to the input device 1F in accordance with the sixth embodiment shown in FIG. 10.

Figure 16A:
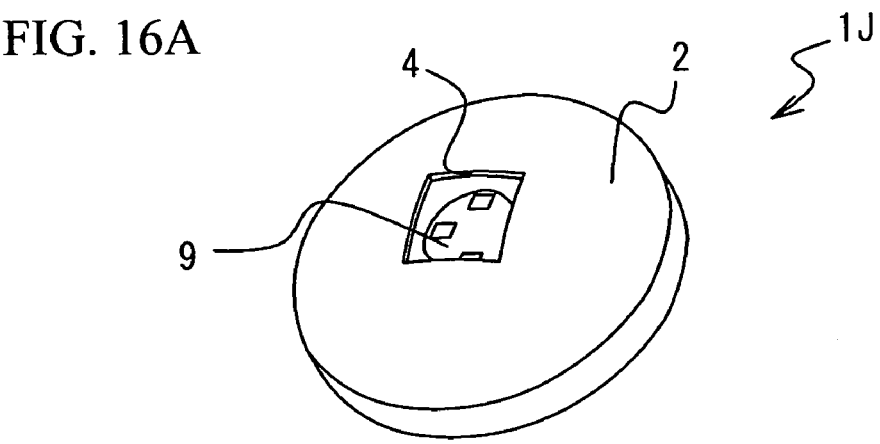
FIGS. 16A through 16D illustrate an input device in accordance with a tenth embodiment of the present invention.
Figure 16B:
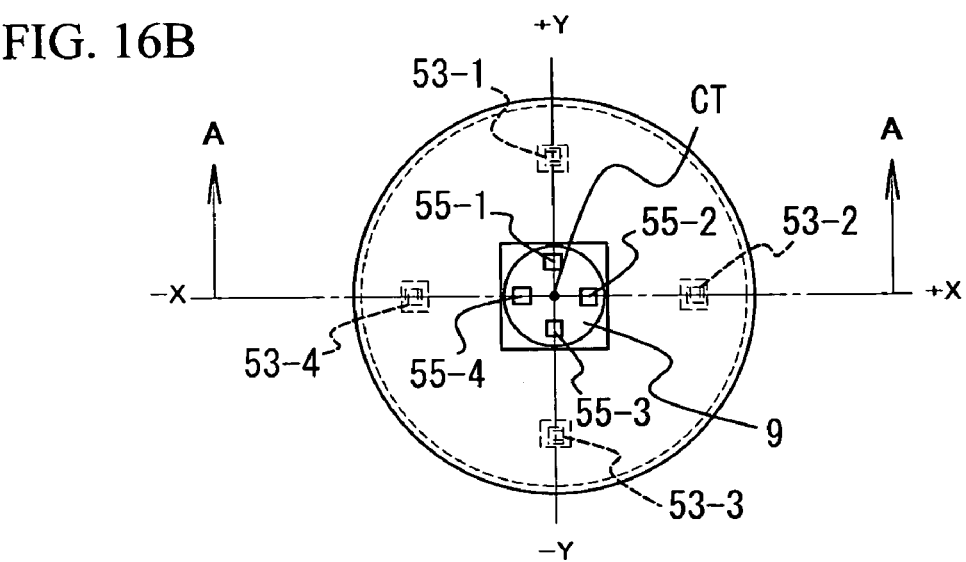
Figure 16C:
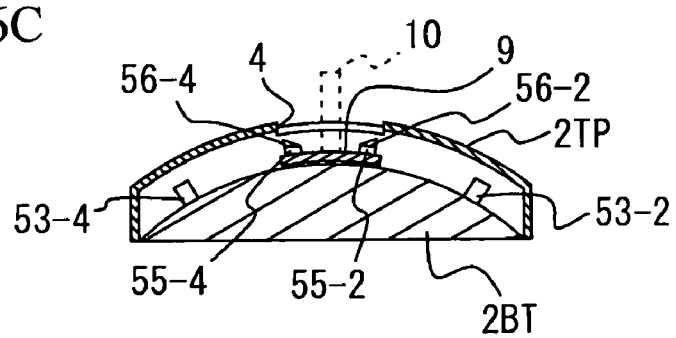
Figure 16D:
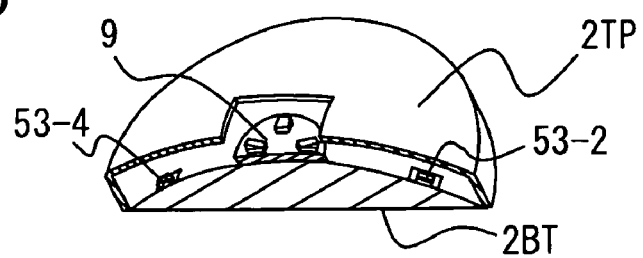

The four LEDs 53-1 through 53-4 are arranged to emit lights toward the photodiodes 55-1 through 55-4 respectively. Prisms 56-1 through 56-4 are respectively arranged on the four photodiodes 55-1 through 55-4 to receive the lights vertical to the upper surface of the bottom plate 2BT, as shown in FIG. 16C but not shown in FIG. 16B. The input device 1J has the same effect as the input device 1I described above.

Concerning with the seventh embodiment and the ninth embodiment, it is demonstrated that a movable object arranged in the cutout 4 is the LED 53, however, a structure in which more than one LED are arranged on the movable object 9 may be employed, as well as the case of the photodiodes. In this case, it is possible to reduce the electric power consumption. In addition, a case has been demonstrated that prisms are arranged on the photodiodes as photoderivative members, yet light guiding tubes like optical fibers may be employed. Further, another case has been demonstrated that a photodiode is used as a photoelectric conversion element in the embodiments described above, yet another light-detecting element may be employed.

Although the above-described embodiments have demonstrated that the four hall elements serving as electromagnetic conversion elements or the four photodiodes serving as photoelectric conversion elements are arranged, however, it should be appreciated that one hall element is respectively arranged on two axes crossed at right angles to each other. In addition, three hall elements or photodiodes may be arranged at even intervals to surround the movable object. Further, it is possible to detect more accurately the position of the movable object if five or more hall elements or photodiodes are arranged, and it is also possible to improve the operational performance of the input device.

While the preferred embodiment of the prevent invention have been illustrated in detail, the invention is not limited to the specific embodiments above. In addition, it will be appreciated that the invention is susceptible of modification, variation and change without departing from the proper and fair meaning of the accompanying claims.

The present invention is based on Japanese Patent Application No. 2004-335191 filed on Nov. 18, 2004, the entire disclosure of which is hereby incorporated by reference.

What is claimed is:

1. An input device comprising:
a substrate; and
a movable object that moves on the substrate,
wherein:
one of the substrate and the movable object includes a magnetic field generator,
the other of the substrate and the movable object includes electromagnetic conversion elements detecting magnetic fields generated outside of the magnetic field generator, and
with respect to the substrate, a top surface of the magnetic field generator is at a same height as a top surface of each of the electromagnetic conversion elements.

2. The input device as claimed in claim 1, wherein:
the substrate has a plate shape;
the magnetic field generator generates magnetic fields vertical to the substrate; and
the substrate includes the electromagnetic conversion elements arranged to surround the movable object.

3. The input device as claimed in claim 2, wherein the electromagnetic conversion elements are arranged on a plane on which the magnetic field generator is arranged.

4. The input device as claimed in claim 1, wherein:
the substrate has a plate shape;
the movable object includes the magnetic field generator generating magnetic fields parallel to the substrate; and
the substrate includes the electromagnetic conversion elements surrounding the movable object.

5. The input device as claimed in claim 1, wherein:
the substrate has a plate shape;
the substrate includes magnetic field generators that generate magnetic fields vertical to the substrate and arranged to surround the movable object; and
the movable object includes the electromagnetic conversion elements corresponding to the magnetic field generators.

6. The input device as claimed in claim 1, wherein:
the substrate has a plate shape;
the substrate includes magnetic field generators that generate magnetic fields parallel to the substrate and surrounding the movable object; and
the movable object includes the electromagnetic conversion elements corresponding to the magnetic field generators.

7. The input device as claimed in claim 1, wherein:
the substrate has a semispherical shape;
the movable object includes the magnetic field generator that generates magnetic fields vertical to the substrate; and
the substrate includes the electromagnetic conversion elements arranged to surround the movable object.

8. The input device as claimed in claim 7, wherein the electromagnetic conversion elements are arranged on a common plane.

9. The input device as claimed in claim 1, wherein:
the substrate has a semispherical shape;
the movable object includes the magnetic field generator that generates magnetic fields tangential to the substrate; and
the substrate includes the electromagnetic conversion elements arranged to surround the movable object.

10. The input device as claimed in claim 1, wherein:
the substrate has a semispherical shape;
the substrate includes magnetic field generators generating magnetic fields vertical to the substrate and arranged to surround the movable object; and
the movable object includes the electromagnetic conversion elements corresponding to the magnetic field generators.

11. The input device as claimed in claim 1, wherein:
the substrate has a semispherical shape;
the substrate includes magnetic field generators generating magnetic fields tangential to the substrate and surroundings the movable object; and
the movable object includes the electromagnetic conversion elements corresponding to the magnetic field generators.

12. The input device as claimed in claim 1, wherein the magnetic field generator is formed of a magnet.

13. The input device as claimed in claim 12, wherein the magnet is an electromagnet.

* * * * *